US012531136B2

(12) United States Patent
Odaibo

(10) Patent No.: US 12,531,136 B2
(45) Date of Patent: Jan. 20, 2026

(54) CLUE: DYNAMIC CONTEXT RETRIEVAL IN REASONING MODELS FOR AI-BASED PROTEIN AND DRUG DESIGN

(71) Applicant: Stephen Gbejule Odaibo, Sugar Land, TX (US)

(72) Inventor: Stephen Gbejule Odaibo, Sugar Land, TX (US)

(73) Assignee: Deep EigenMatics LLC, Sugar Land, TX (US)

( * ) Notice: Subject to any disclaimer, the term of this patent is extended or adjusted under 35 U.S.C. 154(b) by 0 days.

(21) Appl. No.: 19/291,540

(22) Filed: Aug. 5, 2025

(65) Prior Publication Data

US 2025/0364086 A1   Nov. 27, 2025

(51) Int. Cl.
  *G16B 45/00*   (2019.01)
  *G06N 3/0455*  (2023.01)
  *G16B 40/00*   (2019.01)
  *G16B 50/30*   (2019.01)

(52) U.S. Cl.
  CPC .......... *G16B 50/30* (2019.02); *G06N 3/0455* (2023.01); *G16B 40/00* (2019.02); *G16B 45/00* (2019.02)

(58) Field of Classification Search
  None
  See application file for complete search history.

(56) References Cited

U.S. PATENT DOCUMENTS

| | | | | |
|---|---|---|---|---|
| 12,412,091 | B2 * | 9/2025 | Chiu | G06N 3/0442 |
| 12,437,837 | B2 * | 10/2025 | Odaibo | G06N 3/08 |
| 2019/0197400 | A1 * | 6/2019 | Zhang | G06F 16/951 |
| 2019/0293462 | A1 * | 9/2019 | Choi | G06N 3/0455 |
| 2019/0318040 | A1 * | 10/2019 | Chaudhury | G06N 3/094 |
| 2019/0325342 | A1 * | 10/2019 | Sikka | G06F 18/217 |
| 2023/0326545 | A1 * | 10/2023 | Narayanan | G06N 20/00 703/11 |
| 2025/0225161 | A1 * | 7/2025 | Mabey | G06N 3/0455 |
| 2025/0232848 | A1 * | 7/2025 | Stern | G16B 15/20 |
| 2025/0252292 | A1 * | 8/2025 | Shamir | G06N 3/0455 |
| 2025/0273290 | A1 * | 8/2025 | Odaibo | G16B 15/20 |

* cited by examiner

*Primary Examiner* — Eliyah S. Harper

(57) ABSTRACT

Systems, methods, and apparatus for obtaining proteins and small molecules representations for manufacture, using a herein disclosed dynamic Context Load Update Engine (CLUE) during output generation by reasoning models. Pre-trained neural networks equipped with retrieval augmentation and trained on chain-of-thought data for reasoning capacity are used. The pre-trained models are further equipped with an indicator mechanism. During the course of output generation, the indicator mechanism indicates when a need for an update to the context arises; wherein the context is a combination of the input query and the theretofore generated output. Output generation continues between each context update till completion. In one embodiment of the invention, transfer learning is used to train the pre-trained neural network in conjunction with its associated indicator and retrieval mechanisms. The trained system is used to generate representations of proteins or small molecule drugs in response to specifying queries. The generated representations are then manufactured.

18 Claims, 10 Drawing Sheets

Schematic of Chain-of-Thought Supervised Fine-Tuning of a Retrieval Augmented Language Model.

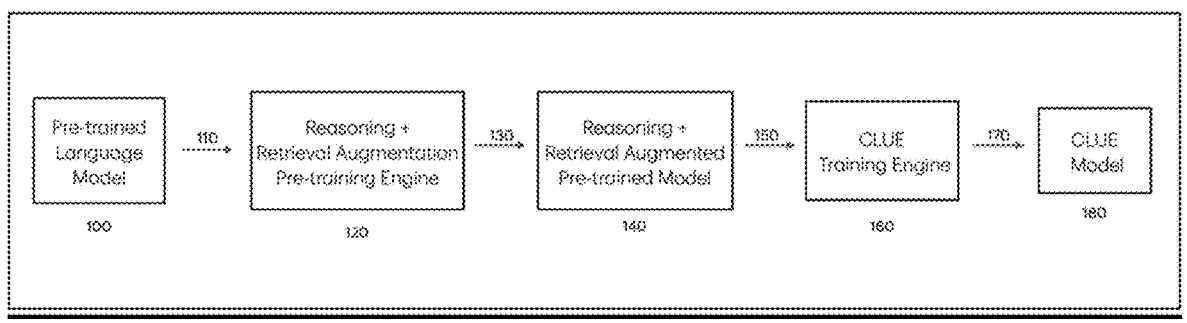
FIG. 1 Flow Diagram of the Development of a CLUE Model.

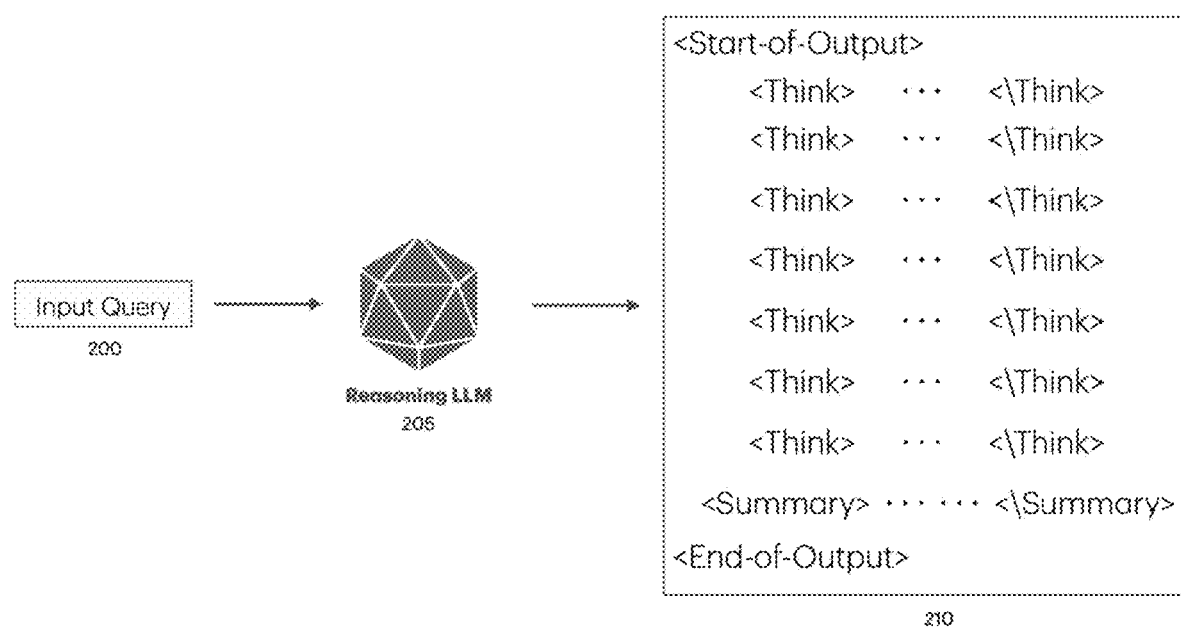
FIG. 2 Illustrative Example of a Chain-of-Thought Syntax Format.

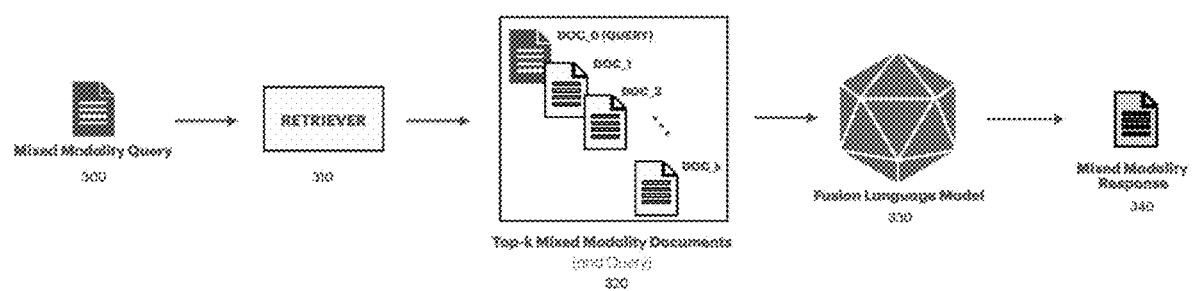
FIG. 3 Schematic Illustration of Retrieval Augmentation.

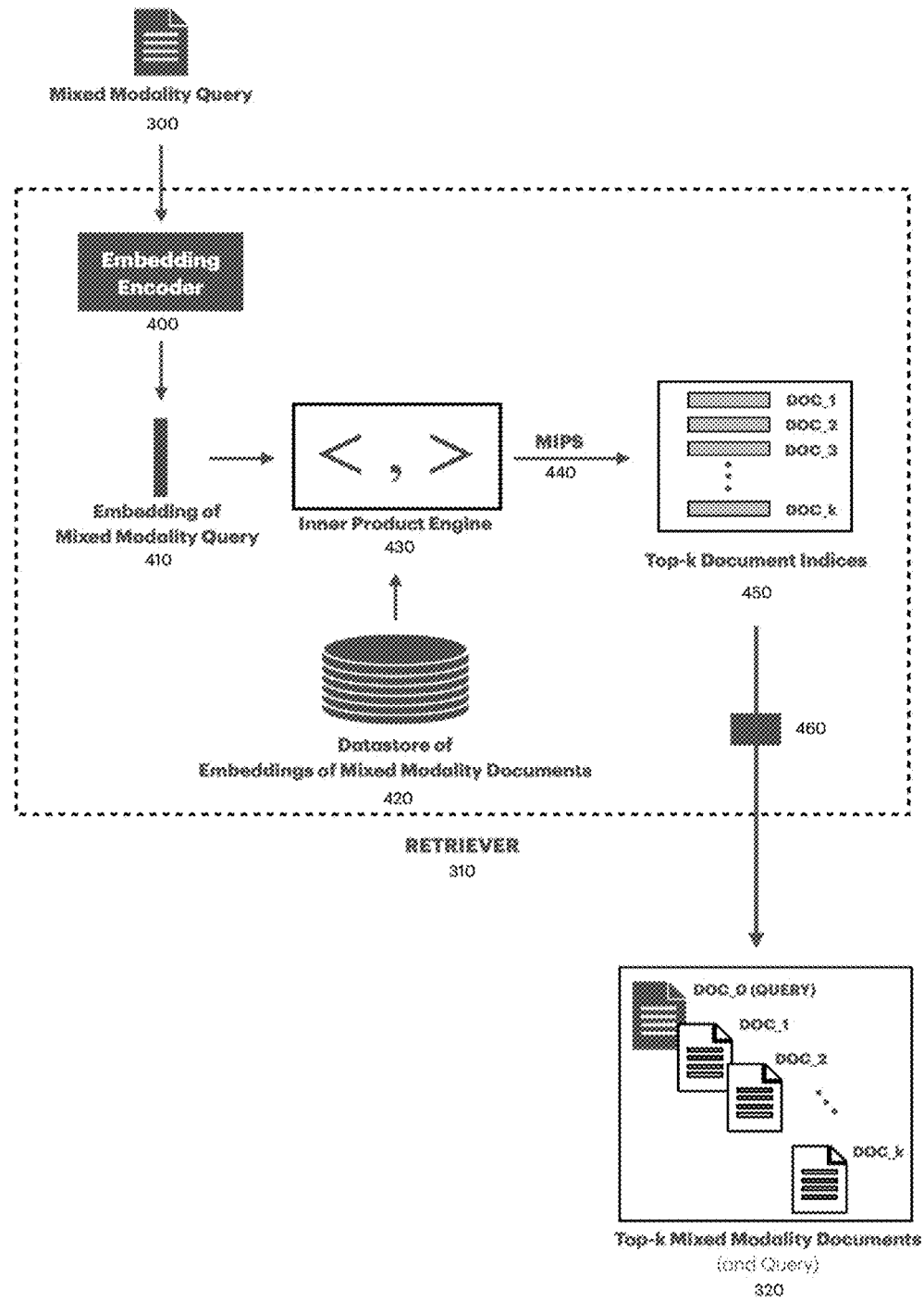
FIG. 4 Schematic Illustration of a Retriever Module in Retrieval Augmentation.

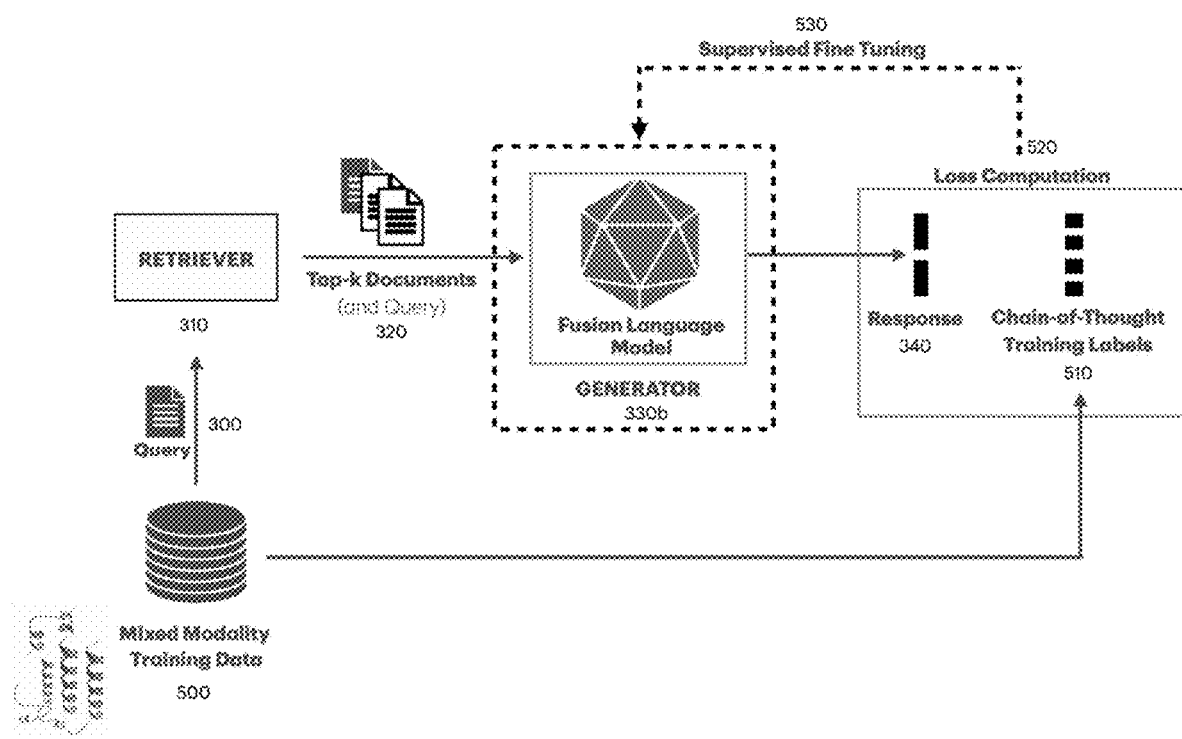
FIG. 5 Schematic of Chain-of-Thought Supervised Fine-Tuning of a Retrieval Augmented Language Model.

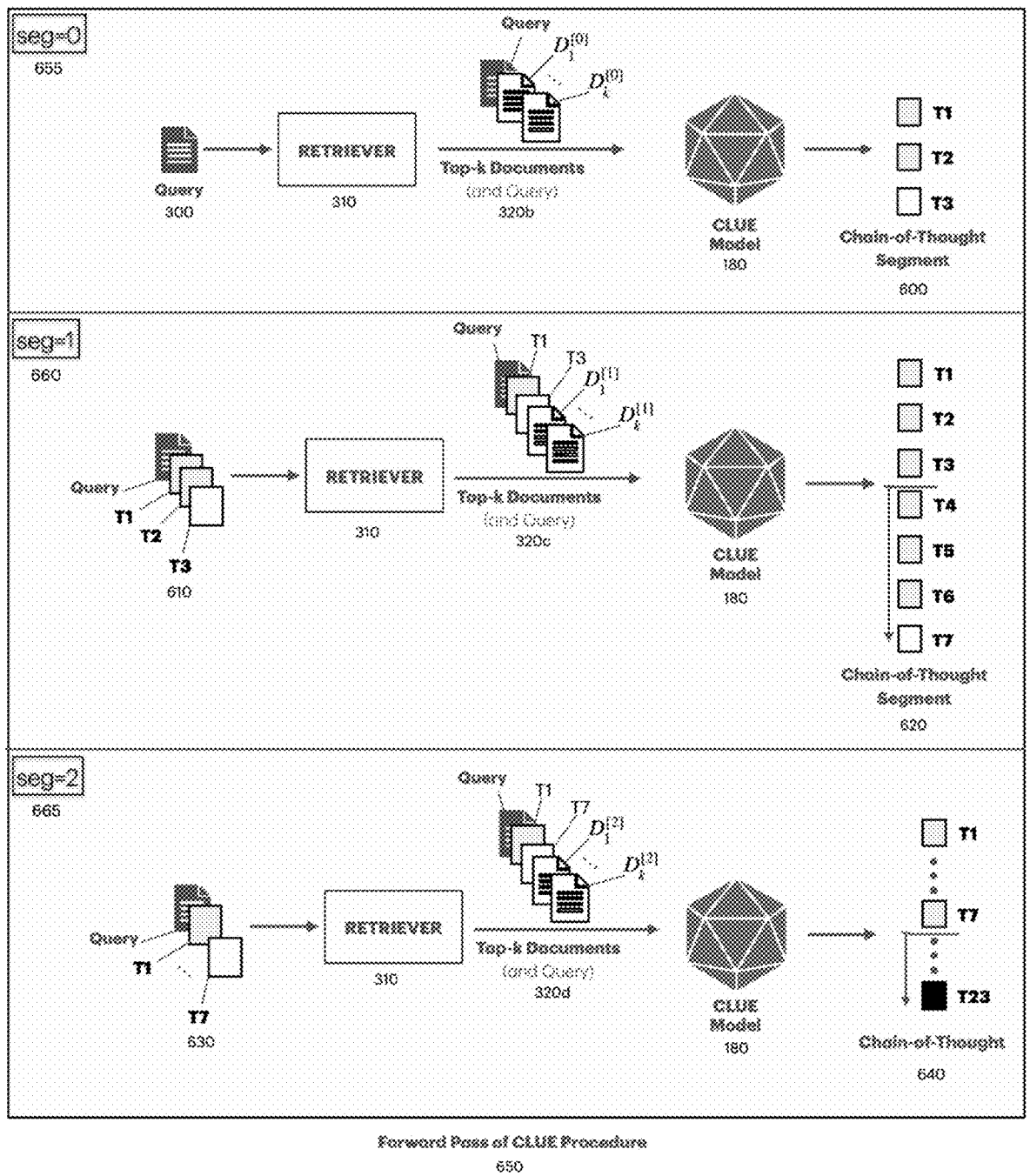
FIG. 6 Illustrative Example of a Forward Pass CLUE Procedure.

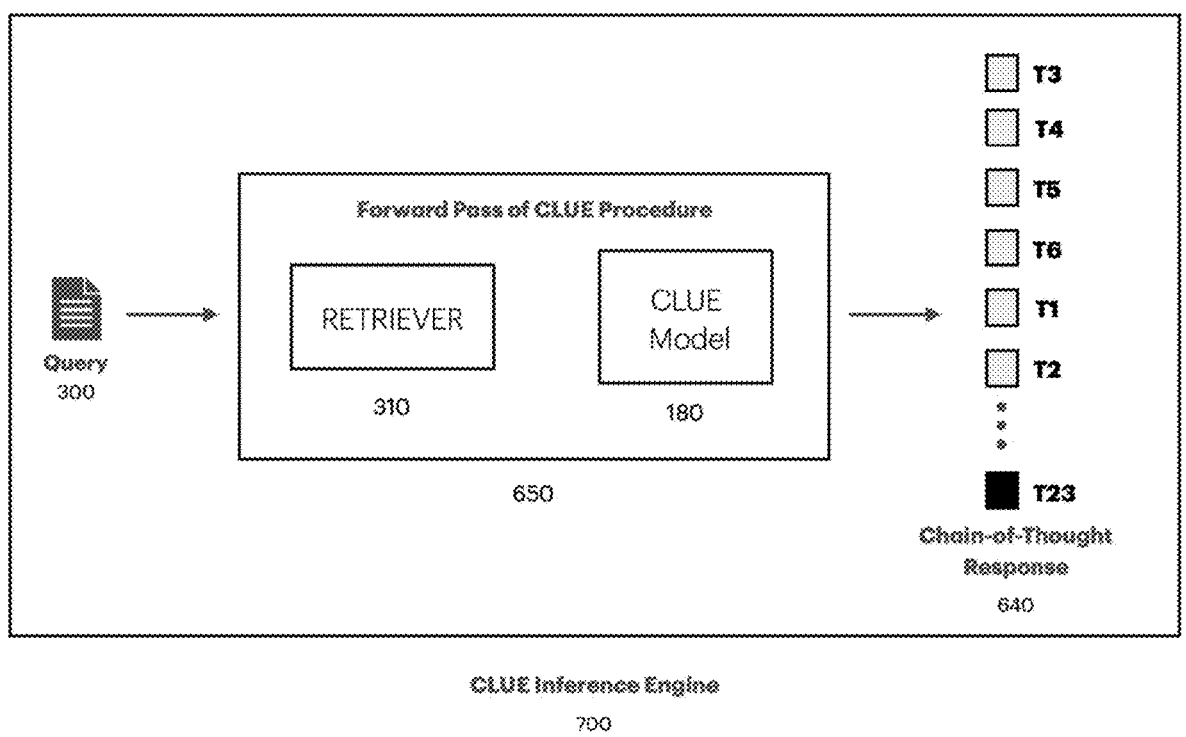
FIG. 7 Schematic Overview of CLUE Inference Engine.

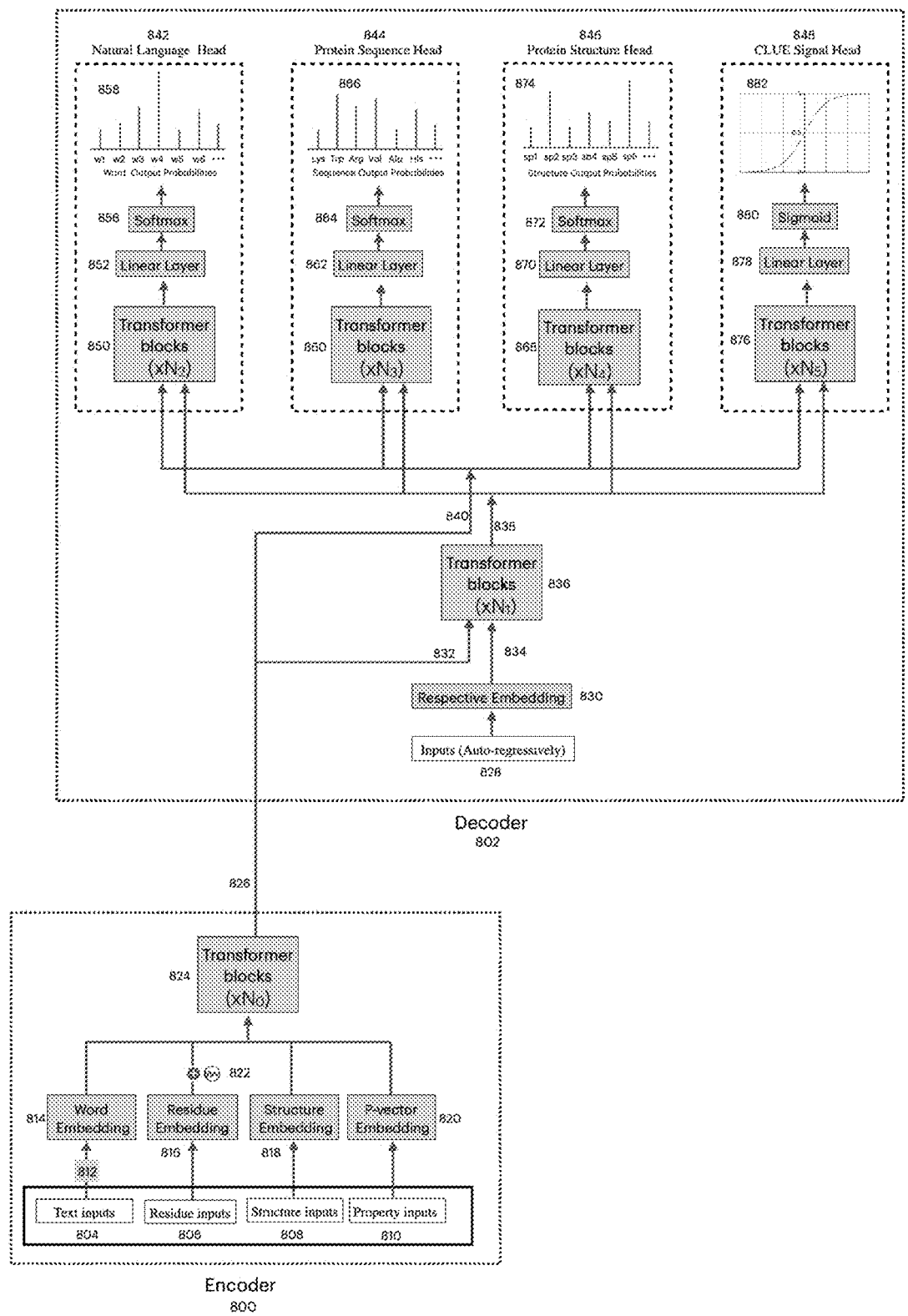
FIG. 8 A Multicapitate Encoder-Decoder Transformer Inference Architecture Embodiment of a CLUE Model.

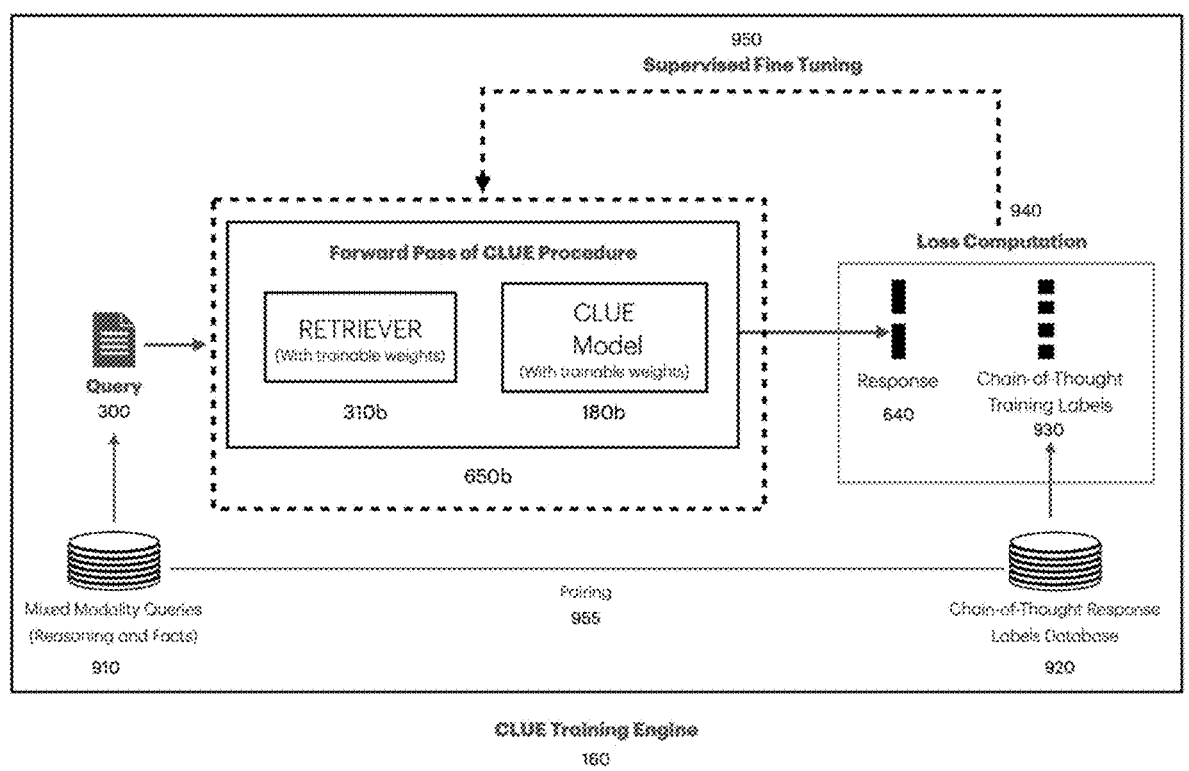
FIG. 9 Schematic Overview of CLUE Training Engine.

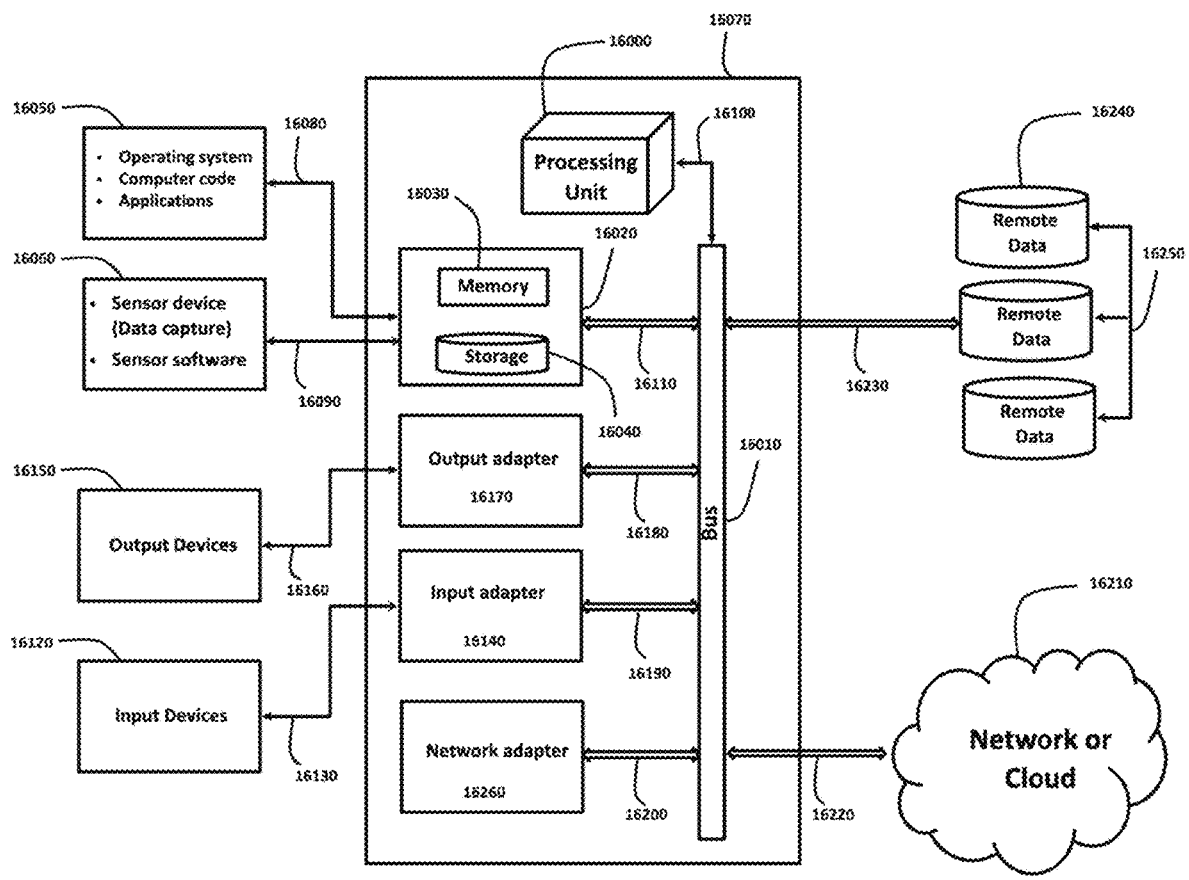
FIG. 10 Computing Environment.

CLUE: DYNAMIC CONTEXT RETRIEVAL IN REASONING MODELS FOR AI-BASED PROTEIN AND DRUG DESIGN

FIELD OF THE INVENTION

The present invention relates generally to Artificial Intelligence (AI) and Machine Learning (ML) methods for protein and drug design, and specifically to retrieval of augmented reasoning models for protein and drug design.

BACKGROUND OF THE INVENTION

Recent advances in deep learning and language models have highlighted their promise for accelerating the new drug development pipeline. However, this promise has yet to fully materialize, and the research and development pipeline for new drugs remains tremendously expensive and lengthy. It still most often costs over $2 billion and more than 10 years to get a single candidate drug through clinical testing. Yet despite the exorbitant investment of time and resources, a high percentage of drugs fail in the clinical testing phases. The primary bottleneck is a lack of machine learning algorithms that can effectively leverage the massive amounts of information that exists about proteins and their cellular function.

Machine learning algorithms exist for retrieval augmentation during output generation by language models. Additionally chain-of-thought supervised fine-tuning models exist and can confer reasoning capability on language models. These techniques are applicable to protein and drug design, and demonstrate a promising avenue for further innovation.

Prior to this disclosure, however, there were no methods in existence for dynamic generalized context (or simply "context") load update and retrieval in multi-modal reasoning models for AI-based protein and drug design. Here the term dynamic means the context is being updated in-stream, i.e. during the course of output generation.

Furthermore, prior to this disclosure, there were no methods in existence for dynamic context load update and retrieval in reasoning models for AI-based protein and drug design.

Furthermore, prior to this disclosure, there were no methods in existence for dynamic context load update and retrieval in reasoning models of any type.

In this disclosure, we use the term "generalized context" (or simply "context") to mean a combination of the input and the theretofore generated output. This differs from the related term context array, which means an array of embedding vectors used in self-attention (or cross-attention) with respect to a given token's embedding. In other words, a context array is the set of vectors that are attended to during an execution of the self-attention (or cross-attention) mechanism-such as in a transformer architecture, for instance. The term context on the other hand, as used here and in the claims, refers to a combination of the input query and the theretofore generated output (during the course of output generation). In some embodiments, both the input query and the theretofore generated output are each themselves represented by arrays of embeddings.

During the course of iteratively generating the tokens of an output response, the theretofore generated response is a key component of the context and should therefore influence the generation process. However, prior to this disclosure, there were no methods in existence that-during the course of output generation-utilized the theretofore generated segment of a response to update the model input, and did so in an end-to-end differentiably learned manner. The heretofore absence of such a method represents a great unmet need. In the area of protein and drug design, wherein the research and development pipeline is lengthy, costly, and of high stakes, utilizing machine learning methods that have no means of leveraging such dynamic context load update can be the difference between success and failure in the quest to bring much needed new and effective drugs to suffering patients.

To address this unmet need, we herein disclose a Context Load Update Engine (CLUE) method. In one embodiment of the invention, the CLUE model is a reasoning model equipped with a retrieval augmented generation mechanism; and further equipped with an end-to-end differentiably learnable indication mechanism which indicates in-stream (i.e. during the course of output generation) whenever an update of the retrieved documents is indicated. Importantly, the indication mechanism depends on the theretofore generated output. In some other embodiments, the indication mechanism may be non-differentiable.

OBJECTS OF THE INVENTION

It is an object of this invention to provide a method and apparatus using reasoning models equipped with dynamic output-dependent context load update for designing and obtaining proteins and drugs.

Yet other objects, advantages, and applications of the invention will be apparent from the specifications and drawings included herein.

SUMMARY OF THE INVENTION

The invention disclosed herein includes a method comprising amongst other steps, receiving at a processor, a pre-trained language model; wherein the pre-trained language model may be multi-modal, with modalities including but in no way limited to one or more of natural language modality, protein sequence modality, protein structure modality, and small molecule drug modality.

In one embodiment, supervised fine tuning (SFT) is performed on the pre-trained language model using a plurality of multi-modal queries each paired with a corresponding multi-modal chain-of-thought response. This serves to confer reasoning capabilities on the model. In some other embodiments, reinforcement learning is used to confer the model with chain-of-thought format generation capability and consequently reasoning capability. Yet in some other embodiments, both supervised fine tuning and reinforcement learning are used on the pre-trained language model to yield a reasoning model.

In addition to reasoning capabilities, the pre-trained language model is conferred with retrieval augmented generation capabilities. A database of document embeddings provides an external (non-parametric) memory source. A method of determining relevance of external document embeddings to a given input query is used. By way of example and not limitation, one such method is Minimum Inner Product Search (MIPS), which produces a ranking of document indices by relevance to the query. The ranking is determined by the inner product of the external document embeddings with the query embedding. In some embodiments, the top-k documents by relevance are returned as output of the retriever module. They are then combined with the query and passed into the model as input. This enables the model to have access to a readily updatable database of external documents, which is much more affordable to update than the parametric memory (i.e. the weights of the language model) which typically requires a tremendous amount of time, effort, and financial resources to train. In some embodiments, the embeddings and/or the ranking algorithm are fine-tuned in tandem with the weights of the language model itself. In other embodiments, the weights of the language model are frozen during the training of the retriever module (consisting of the embeddings and the ranking algorithm). In other embodiments, the weights of the language model may be fine tuned to work with an already trained and frozen retriever module. Yet other such combinations and permutations of the supervised fine tuning process can be implemented for obtaining retrieval augmentation capability.

By the same token, in various embodiments, the previously described process of conferring reasoning capability of the pre-trained language model can be done in any order, combination, or permutation with respect to the conferring of retrieval augmentation capabilities.

The disclosed invention further consists of an indicator mechanism which—during the course of output generation—serves to indicate when an update of the context is indicated. In some embodiments, the indicator mechanism depends on the theretofore generated output. In some embodiments, the theretofore generated output is combined with the query and passed into the retriever module, yielding a set of top-k documents. The top-k documents are then combined with the query and the theretofore generated output, and together passed as input into the model. In some embodiments, the output generation resumes from where it stopped when the context update was indicated. In other embodiments, the output generation may resume from an earlier position, and overwrite any later output tokens. In some embodiments, the generation resumption index is a hyperparameter of the system. The generation resumption index is the index position in the output where the output generation restarts after each context update, i.e. retrieved document update.

The forward pass of a CLUE model consists of the aforementioned steps. In particular, a query is passed into the model; this results in output generation token-by-token. In one embodiment, for each token generated, the indicator mechanism indicates whether or not a context update is needed. If a context updated is deemed needed by the indicator, then the output generation pauses, the theretofore generated output is combined with the query (yielding an updated query), the updated query is then passed into the retriever module, yielding top-k documents. The combination of the top-k and the updated query (the updated input) is then passed as input into the model, causing the output generation to resume. This process repeats as many times as is indicated by the indicator mechanism, till output generation is completed.

In some embodiments, a modulator function or penalty is used to limit the number of context updates that can be indicated during the course of output generation for a given initial query.

In one embodiment, the indicator mechanism is a distinct head of the neural network. It may be a regression head such as having a sigmoid activation as output, for instance. In other embodiments, the indicator mechanism may be a binary classifier output head, such as may be implemented by a softmax activation function. In some other embodiments, the indicator may not be a neural network at all.

In one embodiment of the invention, a trained CLUE model is obtained by performing supervised fine tuning using a plurality of query-response pairs on the procedure described above (i.e. forward pass of a CLUE model). In one embodiment, the queries include reasoning-based queries each with a corresponding chain-of-thought response. The supervised fine tuning is performed iteratively till termination criteria are met.

In some embodiments, obtaining a trained CLUE model involves using reinforcement learning iteratively, wherein with each iteration the forward pass of the CLUE model (or the policy) is used to generate the response (or action) given a query (or state). In other embodiments, some combination of supervised fine tuning and reinforcement learning is used to obtain a trained CLUE model.

The trained CLUE model can be queried for representations of specific proteins or small molecule drugs, wherein the input query specifies conditions on the output protein or small molecule drug.

In one embodiment of the invention, a protein sequence is obtained for synthesis. By way of example and not limitation, the method of synthesis may include Solid-Phase Peptide Synthesis (SPPS), recombinant DNA technology, cell-free expression systems (or In Vitro Transcription and Translation (IVTT)), or mammalian expression systems.

In summary, the invention disclosed herein consists of systems, methods, and apparatus using reasoning models equipped with dynamic output-dependent context load update for designing and obtaining proteins and drugs.

The invention consists of several outlined processes below, and their relation to each other, as well as all modifications which leave the spirit of the invention invariant. The scope of the invention is outlined in the claims section.

BRIEF DESCRIPTION OF THE DRAWINGS

In the following detailed description of the invention, we reference the herein listed drawings and their associated descriptions, in which:

FIG. 1 is a flow diagram of the development of a CLUE model.

FIG. 2 is an illustrative example of a chain-of-thought syntax format.

FIG. 3 is a schematic illustration of retrieval augmentation.

FIG. 4 is a schematic illustration of a retriever module in retrieval augmentation.

FIG. 5 is a schematic of chain-of-thought supervised fine-tuning of a retrieval augmented language model.

FIG. 6 is an illustrative example of a forward pass of a CLUE procedure.

FIG. 7 is a schematic overview of a CLUE inference engine.

FIG. 8 is a multicapitate encoder-decoder transformer inference architecture embodiment of a CLUE model.

FIG. 9 is a schematic overview of a CLUE training engine.

FIG. 10 is an example of a computing environment.

DETAILED DESCRIPTION OF THE PREFERRED EMBODIMENTS

The illustration in FIG. 1 is a flow diagram of the development of a Context Load Update Engine (CLUE) model. A pre-trained language model 100 is received at a processor. In one embodiment, the pre-trained language model 100 is a neural network that has been trained on a plurality of data for a specific task; in one embodiment this may be a transformer-based architecture trained on a large corpus of natural language data and/or protein sequence data and/or protein structure data.

The pre-trained language model 100 is passed as input 110 to a reasoning and retrieval augmentation pre-training engine 120. The reasoning and retrieval augmentation pre-training engine serves the dual tasks of (i) performing reasoning pre-training and (ii) equipping the pre-trained language model with a retrieval augmentation mechanism and performing any associated pre-training for the retrieval augmentation mechanism. The reasoning pre-training involves supervised pre-training with a dataset consisting of reason-based queries and associated chain-of-thought formatted responses.

Here and in the claims, a reason-based query is a query whose correct response can be derived through a reasoning process.

The retrieval augmentation mechanism is a means of augmenting the input query with relevant information from an external database, and thereby modifying the input into the pre-trained language model. In one embodiment, it may itself be a neural network trained to determine relevance of documents in the database to the query. In some embodiments, a neural network embedding converts the documents in the database and the query each into vector embeddings upon which inner product operation can act to determine relevance via similarity.

The reasoning and retrieval augmentation pre-training engine 120 yields a pre-trained model 140 with reasoning and retrieval augmented generation capability. This pre-trained model in turn is passed 150 into a CLUE training engine 160. The CLUE training engine involves equipping the reasoning and retrieval augmentation-capable pre-trained model 140 with an indicator mechanism which during the course of output generation indicates if an update of the retrieved information is indicated. The CLUE training engine 160 yields a CLUE model 180 as output. If during output response generation by the CLUE model, an update to the retrieved information is indicated, the retrieved information is updated and the output generation continues— with updates being done whenever indicated-till termination; at which point the final output is returned.

FIG. 2 illustrates a Reasoning Large Language Model (LLM) 205, which accepts an input query 200 and yields a chain-of-thought formatted response 210. In one embodiment, the individual thoughts constituting the chain-of-thought are delineated within <Think> . . . <\Think> tags. Of note, essentially any arbitrary text can be designated as thought delineation tags in the markup language-so long as it is consistent in the training dataset, the neural network will learn its role. Additionally, in one embodiment, a summary of the response output is presented within <Summary> . . . <\Summary> tags as shown. Again, the specific text used as a summary tag again is arbitrary, is encoded in the training dataset, and is learned by the neural network.

FIG. 3 is a schematic illustration of retrieval augmentation. In this embodiment, a mixed modality query 300 is passed as input into a retriever module 310 which yields as output, the top-k retrieved mixed modality documents (and the input query) 320. This in turn is passed into a fusion language model 330 which yields as output, a mixed modality response 340.

FIG. 4 is a schematic illustration of the retriever module in retrieval augmentation. The mixed modality query 300 is passed into the retriever 310. Within the retriever, the mixed modality query 300 is acted on by an embedding encoder 400 which returns an embedding 410 of the mixed modality query. This in turn is passed into an inner product engine 430. A datastore of embeddings of mixed modality documents 420 is also accessible to the inner product engine 430. In this embodiment, a Minimum Inner Product Search (MIPS) 440 procedure is conducted to yield a ranking of embeddings in the datastore 420 by their inner product with the mixed modality query embedding 410. The top-k document indices by aforementioned rank is returned 450. This in turn passes through a look-up 460 to yield the top-k mixed modality documents 320, wherein the query is also returned as the 0th document.

FIG. 5 is a schematic of chain-of-thought supervised fine-tuning of a retrieval augmented language model. In this one embodiment, a dataset of mixed modality data 500 is used as the training dataset. In one embodiment, the representation modalities' purpose include for representing features of proteins; wherein the represented features include one or more of sequence, structure, function, interactions, interactors, binding partners, attributes, and properties. The respective modalities of the representations include one or more of: natural language representation modality, protein sequence representation modality, protein structure representation modality, or small molecule drug representation modality.

During training, queries 300 are passed into the retriever module 310. This in turn yields top-k documents (and query) 320. The top-k documents (and query) are then passed into a Generator module 330b, which contains a pre-trained fusion language model. A loss 520 is computed by comparing the output of the fusion language model, the response 340, to a corresponding chain-of-thought training label 510. In one embodiment, the supervised fine tuning process 530 entails backpropagating the computed loss for use in updating the pre-trained weights of the fusion language model of the Generator 330b. This process 530 proceeds iteratively till termination criteria are met. The training dataset 500 consists of pairs of mixed modality queries 300 and corresponding chain-of-thought training responses 510 used in the loss computation 520.

FIG. 6 is an illustrative example of a forward pass CLUE procedure. This illustration consists of three phases or segments: "seg=0" 655, "seg=1" 660, and "seg=2" 665. In "seg=0," the input query 300 is passed into the retriever module 310 yielding top-k documents (and query) 320b. The top-k retrieved documents in "seg=0" are labeled $D_1^{[0]}$ . . . $D_k^{[0]}$. In this embodiment, the retrieved documents are then concatenated with the query and passed together as input into the CLUE model 180, which in turn yields the initial segment of a chain-of-thought response 600. This initial segment consists of three thoughts as shown, T1, T2, and T3. In this example, upon generating T3, the indicator mechanism indicates that an update of the retrieved documents is needed. As such, the output generation pauses. This is the end of the "seg=0" phase 655 and the start of the "seg=1" phase 660.

In "seg=1" phase 660, the output 600 of seg=0, i.e. [T1, T2, T3], is concatenated with the query 300 and together passed as input 610 into the retriever module 310. This yields a top-k documents (and "query") 320c, which in one embodiment is a concatenation of the query 300, the output of "seg=0" i.e. [T1, T2, T3], and a newly retrieved set of documents $D_1^{[1]}$ . . . $D_k^{[1]}$. This concatenation 320c is passed as input into the CLUE model 180, yielding a chain-of-thought response 620, which in this embodiment is an extension of the "seg=0" output 600. The output of "seg=1" is [T1, T2, . . . . T7] as shown. During the course of outputting 620, upon getting to T7, the indication mechanism signaled a need for document retrieval update. This prompted a pause of output generation, and end of phase "seg=1" and onset of "seg=2."

In "seg=2," the query 300 concatenated with the chain-of-thought response 620, is passed as input 630 into the retriever module 310. This in turn yields an updated set of documents $D_1^{[2]} \ldots D_k^{[2]}$. The concatenation of the query, the output of "seg=1," and the updated retrieved documents constitutes 320d and is passed as input into the CLUE model 180. This in turn yields the chain-of-thought response 640.

FIG. 7 is a schematic overview of a CLUE inference engine 700. A query 300 is passed into a module 650 that runs the forward pass of CLUE procedure which is illustrated in FIG. 6. The CLUE Forward Pass module consists of a retriever module 310 and a CLUE model 180. The forward pass module acts on the input query to yield a chain-of-thought response 640 consisting of [T1, T2, .... T23].

FIG. 8 is a multicapitate encoder-decoder transformer inference architecture embodiment of a CLUE model. In this embodiment, the encoder 800 can accept a concatenated array of input data of a mix of modalities. In this particular example, the input modalities include natural language (or "text") 804, protein sequence (or "residues") 806, structure inputs 808, and property inputs 810, which are a prespecified data structure (a p-vector) encoding a pre-specified set of properties.

The input data for natural language 804, sequence 806, structure 808, and property 810, are each passed through their respective embeddings, i.e. word embedding 814, residue embedding 816, structure embedding 818, and p-vector embedding 820. The concatenated array of output embedding vectors encodes an input query whose response is a mixed modality output stream at the terminus of the decoder 802. In this particular embodiment, the multicapitate ("multiple headed") architecture consists of one head per output modality: a natural language head 842, a protein sequence head 844, a protein structure head 846, and a small molecule head 848.

Regarding the encoder 800: In this particular embodiment of the invention, each modality of the input data array has a respective embedding. The natural language inputs are first tokenized 812 prior to being passed into its embedding, the word embedding 814. The amino acid sequences are acted on by the respective embedding, the residue embedding 816; the structure inputs are acted on by a structure embedding, and the pre-specified property inputs are acted on by the p-vector embedding. The residue embedding vector is imprinted with a positional encoding 822.

The embedding vector array is then passed into a set of repeating transformer blocks 824. The number of repeats No is a design hyperparameter of the architecture. Within each transformer block is a self-attention mechanism. The transformed output array from the encoder is then passed 826 into the decoder for cross-attention.

The encoder 800 can accept a structure input vector 808 into the structure embedding 818. The structure input vector is a vector of structure parameters. In one embodiment, it is of fixed length, L, and zero padding is used for target proteins whose structure parameters are represented by a vector of smaller length than the fixed length, L. The fixed length, L, is a hyperparameter.

The structure embedding 818 is a weight matrix, $W_s$, which the structure input vector, x, 808 multiplies to yield the structure embedding vector, s, as follows:

$$W_s x = s$$

where $W_s$ is an m×L matrix, L is the fixed length of the structure input vector, and m is the length of the amino acid residue embedding vectors, the length of the property (p-vector) embedding vectors, and the length of the word embedding vectors. They all have the same length m. Both m and L are hyperparameters of the model.

The encoder 800 can also accept a protein's amino acid residue inputs 806, which can be in the form of one-hot-encoder vectors which are passed into the residue embedding 816, wherein the residue embedding is itself a trained neural network. A position encoding 822 can be added to the output residue embedding vectors to imprint a signal of sequence position on the respective residue embeddings.

A variable length array of vectors consisting of embedding vector(s)—wherein each vector is from one of the represented modalities—is passed as input into the transformer block 824. The first layer of the transformer block is an attention layer.

Here and in the claims, transformer means a neural network with an attention mechanism. There are a plurality of ways to implement attention mechanisms. In one embodiment, attention layers consist of three types of weight matrices: a query weight matrix, $W_q$, a key weight matrix, $W_k$, and a value weight matrix, Wv. Each of the embedding vectors in the array are then multiplied by each of the three matrices to obtain respective queries, keys, and values, as follows:

$$W_q u = q$$
$$W_k u = k$$
$$W_v u = v$$

where u is an embedding vector (i.e. in this embodiment u is a word embedding vector, residue embedding vector, structure embedding vector, or p-vector embedding vector).

For each embedding vector in the array, the dot product of its respective query vector is taken with the key vectors of all token representations in the context array. Next, a softmax operation is done on the resulting array to yield a probability distribution for each token. Next, for each token, a linear combination of values v is taken wherein the coefficient of each value is the respective probability (i.e. attention weight). The output of this linear combination is then taken as the token's respective output into the next layer of the transformer. This is done for each token in the encoder, therefore the length of the input array and the length of the output array from this attention layer are the same. Given the ith token, its corresponding coefficient associated with the jth token can be denoted $c_{ij}$ and is given by, $$c_{ij} = \frac{e^{<qi,kj>}}{\sum_p e^{<qi,kp>}}$$

The attention layer output of the ith token can be denoted $o_i$ and is then given by, $$o_i = \sum_j c_{ij} v_j$$

In some embodiments, the dot product $\langle q_i, k_j \rangle$ can be scaled by a variance factor.

The array of outputs $o_i$ are then passed into a normalization layer. Furthermore, a copy of the input array which was passed into the attention layer is passed into and added to a normalization layer, skipping the attention layer. This skip connection serves to preserve the pre-attention layer character signal thereby enhancing available signals for inference.

The output from the Add skip & Norm layer is passed into a feed forward neural network layer and from there into another Add skip & Norm layer. The encoder transformer block 824 of "attention→add skip & norm→feed forward→Add skip & norm" is repeated $N_0$ number of times where $N_0$ is a hyperparameter of the model architecture.

Per autoregression, the inputs 828 into the decoder are the right-shifted outputs of the decoder. At each iteration of the autoregression, the input is acted on by the respective embedding 830 to yield an embedding vector which is passed into the set of repeating transformer blocks 836. The transformer blocks of the decoder are as described earlier for the encoder. The current input token and all preceding tokens are visible to the prediction algorithm and furthermore are used as the context array elements for self-attention. The output of the self-attention layer passes into an add-skip-norm layer and onwards into a cross-attention layer. This input is the subject token of the cross-attention layer, while the encoder's final layer output is the remainder of the context array for cross-attention.

The number of repeats $N_1$ of the decoder body transformer block 836 is a design hyperparameter of the model. The resulting final output of the repeating sequence of decoder body transformer blocks is passed 838 into each head of the decoder as shown. In addition, the encoder's final layer output is also passed 840 into each of the decoder's heads for cross-attention.

The respective number of repeats—$N_2$, $N_3$, $N_4$, $N_5$—of the decoder head transformer blocks are also design hyperparameters of the model. Furthermore, they can be zero, in that some heads may have no transformer blocks.

The final output layer of the decoder head transformer blocks is passed into a linear layer which spans the possible values of each respective head—with the exception of the indication mechanism or "CLUE signal head". E.g. in the case of the natural language head it spans the language's vocabulary; in the case of the sequence head, it spans the set of amino acids; in the case of small molecule drug (SMD) head, it spans a library of SMDs. In each case the domain also includes auxiliary tokens such as <start-of-[MODALITY]> tokens or <end-of output> tokens.

The linear layer output in turn passes into a softmax layer, yielding a probability distribution over the possible values of the respective heads including auxiliary tokens such as <start-of-[MODALITY]> tokens or <end-of output> tokens. The output probability distribution is then sampled to yield the output token at each iteration of the autoregression.

The CLUE signal head 848 is the main part of the indication mechanism in this embodiment. The linear layer 878 feeds into a sigmoid activation function 882 which triggers an indication for retrieved document update when the output exceeds a set threshold.

FIG. 9 is a schematic overview of a CLUE training engine. The training data source is a database consisting of mixed modality queries 910 each paired with a corresponding chain-of-thought response as label 920. The pairing 955 can be implemented a number of ways including via a lookup table or directly in the data structure. From the training database system 910, 920, 955, a query 300 is passed into a Forward Pass of CLUE procedure module 650b, which consists of a retriever module 310b with trainable weights and a CLUE model 180b also with trainable weights. The Forward Pass of CLUE procedure module 650b yields a response 640. The response is compared-via a loss computation 940—to a corresponding chain-of-thought embedding 930 which serves as that response's training label. In some embodiments, supervised fine tuning (SFT) 950 consists of backpropagating the computed loss through both the CLUE model 180b and the retriever module 310b to update their respective weights. In some embodiments the degree to which weights of the retriever module is allowed to be updated relative to the weights of the CLUE model is a hyper-parameter of the system. In other words, the extent to which the weights are unfrozen (i.e. trainable) is a controllable hyper-parameter of the system. Consequently, in such embodiments, the trainability of the retriever relative to that of the CLUE model is effectively a hyper-parameter of such embodiments.

The training process of FIG. 9 proceeds iteratively till some termination criteria are met.

Ones with ordinary skill in the art will recognize that the invention disclosed herein can be implemented over an arbitrary range of computing configurations. We will refer to any instantiation of these computing configurations as the computing environment. An illustrative example of a computing environment is depicted in The Computing Environment FIG. Examples of computing environments include but are not limited to desktop computers, laptop computers, tablet personal computers, mainframes, mobile smart phones, smart television, programmable hand-held devices and consumer products, distributed computing infrastructures over a network, cloud computing environments, or any assembly of computing components such as memory and processing—for example.

As illustrated in The Computing Environment FIG, the invention disclosed herein can be implemented over a system that contains a device or unit for processing the instructions of the invention. This processing unit 16000 can be a single core central processing unit (CPU), multiple core CPU, graphics processing unit (GPU), multiplexed or multiply-connected GPU system, or any other homogeneous or heterogeneous distributed network of processors.

In some embodiment of the invention disclosed herein, the computing environment can contain a memory mechanism to store computer-readable media. By way of example and not limitation, this can include removable or non-removable media, volatile or non-volatile media. By way of example and not limitation, removable media can be in the form of flash memory card, USB drives, compact discs (CD), blu-ray discs, digital versatile disc (DVD) or other removable optical storage forms, floppy discs, magnetic tapes, magnetic cassettes, and external hard disc drives. By way of example but not limitation, non-removable media can be in the form of magnetic drives, random access memory (RAM), read-only memory (ROM) and any other memory media fixed to the computer.

The computing environment can include a system board 16070.

As depicted in The Computing Environment FIG, the computing environment can include a system memory 16030 which can be volatile memory such as random access memory (RAM) and may also include non-volatile memory such as read-only memory (ROM). Additionally, there typically is some mass storage device 16040 associated with the computing environment, which can take the form of hard disc drive (HDD), solid state drive, or CD, CD-ROM, blu-ray disc or other optical media storage device. In some other embodiments of the invention the system can be connected to remote data 16240. Furthermore, the remote data store 16240 can consist of multiple parts connected to each other via an interface 16250.

The computer readable content stored on the various memory devices can include an operating system, computer codes, and other applications 16050, which can be connected via an interface 16080 to memory 16020. By way of example not limitation, the operating system can be any number of proprietary software such as Microsoft windows, Android, Macintosh operating system, iphone operating system (iOS), or Linux commercial distributions. It can also be open source software such as Linux versions e.g. Ubuntu. In other embodiments of the invention, data processing software and connection instructions to a sensor device 16060 can also be stored on the memory mechanism. The procedural algorithm set forth in the disclosure herein can be stored on—but not limited to—any of the aforementioned memory mechanisms. In particular, computer readable instructions for training and subsequent image classification tasks can be stored on the memory mechanism.

The computing environment typically includes a system bus 16010 through which the various computing components are connected and communicate with each other. The system bus 16010 can consist of a memory bus, an address bus, and a control bus. Furthermore, it can be implemented via a number of architectures including but not limited to Industry Standard Architecture (ISA) bus, Extended ISA (EISA) bus, Universal Serial Bus (USB), microchannel bus, peripheral component interconnect (PCI) bus, PCI-Express bus, Video Electronics Standard Association (VESA) local bus, Small Computer System Interface (SCSI) bus, and Accelerated Graphics Port (AGP) bus. The bus system can take the form of wired or wireless channels, and all components of the computer can be located remote from each other and connected via the bus system. By way of example and not of limitation, the processing unit 16000, memory 16020, input devices 16120, output devices 16150 can all be connected via the bus system. In the representation depicted in The Computing Environment FIG, by way of example not limitation, the processing unit 16000 can be connected to the main system bus 16010 via a bus route connection 16100; the memory 16020 can be connected via a bus route 16110; the output adapter 16170 can be connected via a bus route 16180; the input adapter 16140 can be connected via a bus route 16190; the network adapter 16260 can be connected via a bus route 16200; the remote data store 16240 can be connected via a bus route 16230; and the cloud infrastructure can be connected to the main system bus vis a bus route 16220.

In some embodiment of the invention disclosed herein, The Computing Environment FIG illustrates that instructions and commands can be input by the user using any number of input devices 16120. The input device 16120 can be connected to an input adapter 16140 via an interface 16130 and/or via coupling to a tributary of the bus system 16010. Examples of input devices 16120 include but are by no means limited to keyboards, mouse devices, stylus pens, touchscreen mechanisms and other tactile systems, microphones, joysticks, infrared (IR) remote control systems, optical perception systems, body suits and other motion detectors. In addition to the bus system 16010, examples of interfaces through which the input device 16120 can be connected include but are by no means limited to USB ports, IR interface, IEEE 802.15.1 short wavelength UHF radio wave system (bluetooth), parallel ports, game ports, and IEEE 1394 serial ports such as FireWire, i.LINK, and Lynx.

In some embodiment of the invention disclosed herein, The Computing Environment FIG illustrates that output data, instructions, and other media can be output via any number of output devices 16150. The output device 16150 can be connected to an output adapter 16170 via an interface 16160 and/or via coupling to a tributary of the bus system 16010. Examples of output devices 16150 include but are by no means limited to computer monitors, printers, speakers, vibration systems, and direct write of computer-readable instructions to memory devices and mechanisms. Such memory devices and mechanisms can include by way of example and not limitation, removable or non-removable media, volatile or non-volatile media. By way of example and not limitation, removable media can be in the form of flash memory card, USB drives, compact discs (CD), blu-ray discs, digital versatile disc (DVD) or other removable optical storage forms, floppy discs, magnetic tapes, magnetic cassettes, and external hard disc drives. By way of example but not limitation, non-removable media can be in the form of magnetic drives, random access memory (RAM), read-only memory (ROM) and any other memory media fixed to the computer. In addition to the bus system 16010, examples of interfaces through which the output device 16150 can be connected include but are by no means limited to USB ports, IR interface, IEEE 802.15.1 short wavelength UHF radio wave system (bluetooth), parallel ports, game ports, and IEEE 1394 serial ports such as FireWire, i.LINK, and Lynx.

In some embodiment of the invention disclosed herein some of the computing components can be located remotely and connected to via a wired or wireless network. By way of example and not limitation, The Computing Environment FIG shows a cloud 16210 and a remote data source 16240 connected to the main system bus 16010 via bus routes 16220 and 16230 respectively. The cloud computing infrastructure 16210 can itself contain any number of computing components or a complete computing environment in the form of a virtual machine (VM). The remote data source 16240 can be connected via a network to any number of external sources such as NMR spectrometry devices, X-ray diffraction devices, electron microscopes, imaging devices, imaging systems, or imaging software.

In some embodiment of the invention disclosed herein, a sensor system 16060 which captures and pre-processes data is attached directly to the system. For example, this may be an electron microscope (and associated image processing software); it may be a camera in the case of an imaging system, say for processing distance map photographs; or it may be an X-ray crystallography machine or an NMR spectrometer (and associated software), etcetera. The sensor system can be connected to memory 16020 via an interface 16090. Stored in the memory mechanism—16020, 16240, or 16210—are machine learning models, algorithms, and data products developed according to the procedures set-forth herein. Computer-readable instructions are also stored in the memory mechanism, so that upon command, protein structure representation data, its substrates and associated data can be captured or can be received over a network from a remote or local previously collated database. This transmission of data can be done over a wired or wireless network as previously detailed, as the source and/or recipient of the data output can be at a remote location.

The objects set forth in the preceding are presented in an illustrative manner for reason of efficiency. It is hereby noted that the above disclosed methods and systems can be implemented in manners such that modifications are made to the particular illustration presented above, while yet the spirit and scope of the invention is retained. The interpretation of the above disclosure is to contain such modifications, and is not to be limited to the particular illustrative examples and associated drawings set-forth herein.

Furthermore, by intention, the following claims encompass all of the general and specific attributes of the invention described herein; and encompass all possible expressions of the scope of the invention, which can be interpreted—as pertaining to language—as falling between the aforementioned general and specific ends.

What is claimed:

1. A method, comprising: a) receiving, at a processor, a neural network ("base neural network") trained to output chain-of-thought responses to reason-based queries, wherein the base neural network is also equipped with a retrieval augmentation mechanism:
   i) wherein the base neural network is trained using a dataset including one or more of representations of a plurality of proteins or a plurality of protein-ligand complexes,
   ii) wherein the retrieval augmentation mechanism is a mechanism that given an input query for a neural network, retrieves information from a memory, and passes a combination of the input query and the retrieved information as input into the neural network;
   iii) wherein the base neural network's output and input each consist of a sequence of embeddings, and wherein the output is generated via an autoregressive procedure
   b) equipping the base neural network with an indicator mechanism:
   i) wherein during the course of output generation for a given input query, the indicator mechanism determines if an update of the retrieved information is indicated;
   c) using the base neural network to generate a representation of a protein in response to an input query specifying conditions on that protein:
   i) wherein during output generation, the indicator mechanism determines if an update of the retrieved information is indicated,
   ii) wherein during output generation, the retrieved information is updated if indicated by the indicator mechanism.

2. The method of claim 1, wherein the protein is synthesized.

3. The method of claim 2, wherein the indicator mechanism is a neural network configured to accept as input, the output from a layer of the base neural network.

4. The method of claim 3, wherein transfer learning is used to train the indicator mechanism neural network in conjunction with the base neural network and retrieval mechanism.

5. The method of claim 4, wherein the base neural network is a transformer with an encoder-decoder architecture.

6. The method of claim 5, wherein the output of the encoder's final layer is an input array for cross-attention layer(s) of the decoder.

7. The method of claim 6, wherein during output generation, with each embedding generated by the base neural network, the indicator neural network indicates whether to update the retrieved information; the method further comprising:
   a) updating the retrieved information when indicated by the indicator mechanism, wherein the update procedure consists of the following steps: i) | concatenating the input query with the array of theretofore generated output embeddings to yield an updated input query, ii) passing the updated input query into the retrieval mechanism to obtain updated retrieved information;
   b) concatenating the updated input query with the updated retrieved information and passing the resulting concatenation as input into the base neural network encoder;
   c) obtaining the updated output from the encoder's final layer, and using that output as encoder input to the cross-attention layer(s) of the decoder;
   d) resuming the autoregressive output generation to update the theretofore generated output sequence;
   e) repeating the above steps each time an update of retrieved information is indicated by the indicator mechanism during the course of output generation;
   f) obtaining the protein representation and terminating the autoregression when termination criteria are met.

8. The method of claim 7, wherein the input query specifies conditions for a peptide ligand of a receptor.

9. A method, comprising:
   a) receiving, at a processor, a neural network ("base neural network') trained to output chain-of-thought responses to reason-based queries, wherein the base neural network is also equipped with a retrieval augmentation mechanism:
   i) wherein the base neural network is trained using a dataset including one or more of representations of a plurality of proteins or a plurality of protein-ligand complexes,
   ii) wherein the retrieval augmentation mechanism is a mechanism that given an input query for a neural network, retrieves information from a memory, and passes a combination of the input query and the retrieved information as input into the neural network;
   iii) wherein the base neural network's output and input each consist of a sequence of embeddings, and wherein the output is generated via an autoregressive procedure
   b) equipping the base neural network with an indicator mechanism:
   i) wherein during the course of output generation for a given input query, the indicator mechanism determines if an update of the retrieved information is indicated;
   c) using the base neural network to generate a representation of a small molecule drug in response to an input query specifying conditions on that small molecule drug:
   i) wherein during output generation, the indicator mechanism determines if an update of the retrieved information is indicated,
   ii) wherein during output generation, the retrieved information is updated if indicated by the indicator mechanism.

10. The method of claim 9, wherein the small molecule drug is manufactured.

11. The method of claim 10, wherein the indicator mechanism is a neural network configured to accept as input, the output from a layer of the base neural network.

12. The method of claim 11, wherein the base neural network is a transformer with an encoder-decoder architecture.

13. The method of claim 12, wherein the output of the encoder's final layer is an input array for cross-attention layer(s) of the decoder.

14. The method of claim 13, wherein during output generation, with each embedding generated by the base neural network, the indicator neural network indicates whether to update the retrieved information; the method further comprising:
   a) updating the retrieved information when indicated by the indicator mechanism, wherein the update procedure consists of the following steps:
      i) concatenating the input query with the array of theretofore generated output embeddings to yield an updated input query,
      ii) passing the updated input query into the retrieval mechanism to obtain updated retrieved information;
   b) concatenating the updated input query with the updated retrieved information and passing the resulting concatenation as input into the base neural network encoder;
   c) obtaining the updated output from the encoder's final layer, and using that output as encoder input to the cross-attention layer(s) of the decoder;
   d) resuming the autoregressive output generation to update the theretofore generated output sequence; e) repeating the above steps each time an update of retrieved information is indicated by the indicator mechanism during the course of output generation;
   f) obtaining the protein representation and terminating the autoregression when termination criteria are met.

15. The method of claim 14, wherein the input query specifies conditions for a small molecule drug ligand of a receptor.

16. An apparatus, comprising: a processor and an associated memory, wherein the memory stores instructions that when executed by the processor, cause the processor to:
   a) receive a neural network ("base neural network") trained to output chain-of-thought responses to reason-based queries, wherein the base neural network is also equipped with a retrieval augmentation mechanism:
      i) wherein the base neural network is trained using a dataset including one or more of representations of a plurality of proteins or a plurality of protein-ligand complexes, wherein the respective modalities of the representations include one or more of: (1) a natural language representation modality, (2) a sequence representation modality, (3) a structure representation modality, or (4) a small molecule drug representation modality,
      ii) wherein the represented features of the proteins or protein-ligand complexes include one or more of sequence, structure, function, interactions, interactors, binding partners, attributes, or properties;
      iii) wherein the base neural network is configured to accept as input data, a query consisting of one or more of the modalities, and to yield as output data, a response to the query, wherein the response also consists of one or more of the modalities,
      iv) wherein the retrieval augmentation mechanism is a mechanism that given an input query for a neural network, retrieves information from a memory, and passes a combination of the input query and the retrieved information as input into the neural network;
      v) iii) wherein the base neural network's output and input each consist of a sequence of embeddings, and wherein the output is generated via an autoregressive procedure
   b) equip the base neural network with an indicator mechanism:
      i) wherein during the course of output generation for a given input query, the indicator mechanism determines if an update of the retrieved information is indicated;
   c) use the base neural network to generate a representation of a ligand in response to an input query specifying conditions on that ligand:
      i) wherein during output generation, the indicator mechanism determines if an update of the retrieved information is indicated,
      ii) wherein during output generation, the retrieved information is updated if indicated by the indicator mechanism.

17. The apparatus of claim 16, further comprising manufacturing the ligand.

18. The apparatus of claim 16, wherein the indicator mechanism is a neural network, and wherein the indicator mechanism neural network is configured to accept as input, the output from a layer of the base neural network.

* * * * *